US011023302B2

(12) United States Patent
Thornley et al.

(10) Patent No.: US 11,023,302 B2
(45) Date of Patent: Jun. 1, 2021

(54) METHODS AND SYSTEMS FOR DETECTING AND CAPTURING HOST SYSTEM HANG EVENTS

(71) Applicant: DELL PRODUCTS L.P., Round Rock, TX (US)

(72) Inventors: Bryan Thornley, Burnet, TX (US); Adolfo S. Montero, Pflugerville, TX (US); Ed Benyukhis, Austin, TX (US); Craig Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 15/914,644

(22) Filed: Mar. 7, 2018

(65) Prior Publication Data

US 2019/0278651 A1    Sep. 12, 2019

(51) Int. Cl.
 *G06F 11/07* (2006.01)
(52) U.S. Cl.
 CPC ........ *G06F 11/0757* (2013.01); *G06F 11/079* (2013.01); *G06F 11/0772* (2013.01); *G06F 11/0775* (2013.01); *G06F 11/0793* (2013.01); *G06F 2201/83* (2013.01)
(58) Field of Classification Search
 CPC ............. G06F 2201/00; G06F 2201/80; G06F 2201/83; G06F 2201/86; G06F 11/006; G06F 11/079; G06F 11/0793; G06F 11/0748; G06F 11/0709
See application file for complete search history.

(56) References Cited

U.S. PATENT DOCUMENTS

| 5,875,484 | A  | * | 2/1999  | Neuhard ................. G06F 11/07 710/200 |
| 6,625,809 | B1 |   | 9/2003  | Duff |
| 6,697,972 | B1 | * | 2/2004  | Oshima ............... G06F 11/0751 714/55 |
| 7,315,962 | B2 |   | 1/2008  | Neuman et al. |
| 8,589,730 | B2 |   | 11/2013 | Byom et al. |
| 9,529,661 | B1 | * | 12/2016 | Miller ................. G06F 11/3476 |

(Continued)

OTHER PUBLICATIONS

Wikipedia's System Management Mode historical version published Nov. 11, 2017 https://en.wikipedia.org/w/index.php?title=System_Management_Mode&oldid=809841967 (Year: 2017).*

(Continued)

*Primary Examiner* — Joseph O Schell
(74) *Attorney, Agent, or Firm* — Egan, Enders & Huston LLP.

(57) ABSTRACT

Methods and systems are provided that may be implemented to detect and capture information related to host system hang events which may occur during booted and in-band operation of an information handling system, e.g., for further analysis such as debugging. The disclosed methods and systems may be employed to monitor for behavior that is indicative of the occurrence of a host processing device system hang event that occurs while a host operating system is booted and running on the host processing device. Information regarding the nature and/or cause of a detected system hang event may be captured and stored for further analysis and/or for identifying a corrective action.

30 Claims, 4 Drawing Sheets

(56) References Cited

U.S. PATENT DOCUMENTS

| | | | |
|---|---|---|---|
| 2001/0025371 A1* | 9/2001 | Sato | G06F 11/0712 717/128 |
| 2004/0260678 A1 | 12/2004 | Verbowski et al. | |
| 2006/0062046 A1 | 3/2006 | Babudri et al. | |
| 2007/0011500 A1* | 1/2007 | Dasari | G06F 11/0745 714/100 |
| 2008/0126301 A1* | 5/2008 | Bank | G06F 11/366 |
| 2014/0281618 A1 | 9/2014 | Sultenfuss et al. | |
| 2016/0055262 A1* | 2/2016 | Bhattacharjee | G06F 11/0778 707/722 |
| 2016/0321131 A1* | 11/2016 | Miyamoto | G06F 11/2289 |
| 2017/0024164 A1* | 1/2017 | Yang | G06F 3/0652 |
| 2018/0074884 A1 | 3/2018 | Cady et al. | |
| 2018/0113764 A1* | 4/2018 | Bhandari | G06F 11/1441 |

OTHER PUBLICATIONS

Casparian et al. "Systems and Methods For Indicating Real Time Availability Of Key Assemblies For User Input To An Information Handling System", U.S. Appl. No. 15/587,103 filed May 4, 2017, DELL:215, 104 pgs.

Montero et al., "Systems And Methods For Resetting One Or More System Components In Response To A Watchdog Timer (WDT) Event" U.S. Appl. No. 15/726,119 filed Oct. 5, 2017, DELL:221, 35 pgs.

Wikipedia, "Hang", Printed from Internet Feb. 20, 2018, 3 pgs.

Wikipedia, "System Management Mode", Printed from Internet Jan. 26, 2018, 4 pgs.

Wikipedia, "Machine Check Architecture", Printed from Internet Mar. 4, 2018, 1 pg.

* cited by examiner

METHODS AND SYSTEMS FOR DETECTING AND CAPTURING HOST SYSTEM HANG EVENTS

FIELD

The present invention relates to information handling systems, and more particularly to host system hangs.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate a wide variety of hardware, firmware and software components to provide flexible operations that readily adapt to a variety of tasks. During normal operations, an operating system executing on a central processing unit (CPU) typically manages the interaction of components, such as with drivers that communicate to hardware components through firmware executing on hardware components. Examples of such management include interactions with display devices through graphics processing units (GPUs), interaction with human interface devices (HIDs) through an embedded (keyboard) controller, interaction with networks through network interface cards (NICs) and interaction with external peripheral devices through Universal Serial Bus (USB) hubs and controllers. Operating systems generally have integrated error management capabilities that report and correct errors that might arise at various hardware and firmware components. For example, once an operating system is executing on a CPU, the operating system can reset components that do not provide expected results and then gather error data to report to the user. Operating systems, such as WINDOWS, have Internet access and relatively large memory storage available to manage error codes related to hardware and firmware components. When errors arise, operating systems present error information to a user with a display. In some instances, operating systems have a "safe" mode that presents information using an integrated graphics processor so that even a failure of the GPU does not prevent communication of error status to an end user.

One difficulty that arises with error reporting is that errors may occur before an operating system is operational. Typically, on power-up the information handling system executes embedded code on a keyboard or other embedded controller to initiate execution of instructions on a CPU that perform a power-on self-test (POST) and then boot the operating system from persistent memory, such as from a hard disk drive or solid state drive. For example, upon initiation of power an embedded controller (EC) executes firmware instructions that assert a platform reset signal on the CPU. In response, the CPU fetches initiation code from an SPI ROM connected through a Southbridge component of a chipset, such as the PCH component on Intel platforms. The initiation code retrieves a basic input/output system (BIOS) stored in flash memory that executes on the CPU and initiates power-up of other hardware components. Once the hardware components are initialized and prepared to interact with the operating system, the BIOS retrieves code for executing the operating system from the persistent storage. The boot process is then handed off to the operating system, which executes its own code to complete boot into an operational state. If an error occurs before initialization of the operating system, then only limited BIOS functionality is typically available to present information to an end user and otherwise handle the error. If the information handling system progresses through BIOS initialization to have an operational display, then the user may get some feedback about detected errors through displayed output. If an error prevents display initialization, the user often has very little indication that an error has occurred other than a blank screen. In some instances, LED indicators may be included to show an error state and provide some limited information about the error state. If, however, an error occurs during power-up and before POST completes, the BIOS may not have any ability to communicate any error state to the end user. In such instances, the end user has a poor experience that often results in return of the information handling system.

In addition to implications for end user experience, pre-boot, no-POST catastrophic failures are difficult to analyze from returned information handling systems. The returned system often has very little useful information to help isolate the failure other than by performing a forensic teardown to find the faulty component. Such tear downs are expensive and do not yield definitive results for the cause of failure in the field. Even where a forensic teardown determines a problem's root cause in a particular information handling system platform, the teardown analysis does not translate well to other types of platforms with similar components. Random sampling of failed systems typically provides an inadequate quantity of information to determine statistically relevant failure trends, especially across different types of hardware platforms. Definitive fault identification allows corrective actions by replacing unreliable component sources, but also helps to define pre-boot code that will complete enough initiation to provide communication of fault information for corrective action instead of dead system with no display. The cost of obtaining statistically significant fault identification information in no-POST no-display failures often exceeds the benefit of fault identifications where fault types are infrequently encountered.

SUMMARY

Disclosed herein are methods and systems that may be implemented to detect and capture information related to host system hang events which may occur during operation of an information handling system, e.g., for further analysis such as debugging and isolating issues in information handling system development, repair, and in the field which can be otherwise very costly. In one embodiment, the disclosed methods and systems may be integrated into components of an information handling system and employed to detect such system hangs by monitoring system behavior that is indicative of the occurrence of a host processing device system hang event that occurs during system operation while a host operating system is booted and running on the host processing device. Using the disclosed methods and systems, information regarding the nature and/or cause of such a detected system hang event may be captured and stored for further analysis, e.g., to facilitate system repair in the field, to facilitate debugging and/or isolating system issues during system development, etc. The disclosed methods and systems may be implemented to so capture and store information regarding nature and/or cause of system hang events while the host processing device is hung (e.g., executing in a loop) and has ceased to operate normally such that no processor traps are available for error capture or debugging. In one embodiment, the disclosed methods and systems may be advantageously integrated to execute as a built-in debugging tool on one or more processing devices of an information handling system, e.g., to reduce debugging costs and to facilitate debugging of more complex information handling system configurations.

In one exemplary embodiment, a System Hang Fault Isolation (SHFI) method may be implemented using process flows within an out-of-band processing device (e.g., such as embedded controller, service processor, baseboard management controller, remote access controller, etc.) and system basic input/output system (SBIOS) that is executing on an in-band host processing device such as a central processing unit (CPU). The out-of-band processing device may be employed to monitor for system hangs in real time that occur during in-band operation of a host processing device (e.g., such as host central processing unit), and to cause context information (e.g., information regarding location in processing device code where system hang is occurring such as failing assembly instruction pointer, CPU registers, stack frame, etc.) of the host processing device at the time of the system hang to be dynamically captured in real time and saved to system non-volatile memory (NVM), such as non-volatile random access memory (NVRAM), even while the in-band host processing device is hung or not responding. This saved context information may be later retrieved and analyzed, e.g., such as for use in source level debugging and root cause analysis. It will also be understood that an out-of-band processing device is a processing device separate and independent from any in-band host processing device such as a central processing unit (CPU) that executes a host operating system (OS) of an information handling system, and without management of any application executing with a host OS on the host processing device.

As just one example, an embedded controller or other out-of-band processing device of an information handling system may continuously monitor for occurrence of system hang events during in-band operation of a CPU or other host processing device of the information handling system after the system including operating system (OS) has booted up. Such a system hang event may correspond to a system operating state in which one or more applications and/or the OS that are executing on the host processing device have ceased to respond to user input and/or stop operating normally, e.g., such as may occur when the host processing device is engaged in an infinite-loop or uninterruptible lengthy computation, when system resources required by the host processing device are unavailable or exhausted by other processes, when a hardware or software logic error occurs, processing device interrupt storm (i.e., interrupt that cannot be cleared), etc. Examples of indications of such a system hang event occurrence include, but are not limited to, a user-activated power button override, user entry of one or more hot key inputs to activate system debugging, watchdog timer event occurrence, chassis intrusion switch activation, etc. or any other type of events capable of generating a system management interrupt (SMI) in response to a system hang event.

Once such a system hang event is detected by the out-of-band processing device, firmware executing on the out-of-band processing device may generate a unique system management interrupt (SMI) that is provided to the host processing device to cause the SBIOS executing on the host processing device to take control of the host processing device, e.g., for debugging purposes. The SBIOS executing on the host processing device may be configured to respond to the SMI by entering system management mode (SMM), and may also be configured to save the current context of the host processing device (e.g. CPU context information such as copies of last CPU registers) at the time of system hang failure into SMM "save state" region of system management RAM (SMRAM), and then to extract at least a portion of this host processing device context information from SMRAM and save it as fault information into NVM such as NVRAM. Examples of context information that may be so extracted from the SMM "save state" region and saved as fault information to NVM include, but is not limited to, information regarding location in processing device code where system hang is occurring such as failing assembly instruction pointer, CPU registers, stack frame, etc. In one exemplary embodiment, the SBIOS may use the extracted host processing device context information from SMRAM to create a Fault Signature Record (FSR) that includes portions of the saved context information.

In one exemplary embodiment, the above-described FSR may be stored in a memory region of a NVRAM memory device that is integrated on a motherboard of the information handling system, e.g., so that the saved context information follows and remains with the motherboard in case the system is later taken apart and separated from other components of the information handling system. An error hash of the FSR may also be stored and may include information associated with and/or uniquely identifying the source of the system hang fault, e.g., such as the instruction module and offset associated with the system hang fault, central processing unit (CPU) machine check architecture (MCA) model-specific registers (MSR) for Intel processor architectures (e.g., cache errors, system bus errors, ECC errors, parity errors, translation lookaside buffer errors, etc.) associated with the fault, identifier of one or more hardware component/s of the information handling system that are associated with the fault, non-maskable interrupt (NMI) generated from failure of a PCIe device or other hardware device associated with the fault, and/or other information associated with the fault, etc. This FSR and hash may be later analyzed to support corrective action and more precise identification of system hang root cause/s. It will be understood that additional and/or alternative types of information may be stored to NVM upon system hang occurrence, e.g., including additional host processing device context information from SMM save state of SMRAM.

In one exemplary embodiment, hashes may be communicated from an information handling system to a centralized fault database for analysis and identification of corrective actions. For example, statistical relationships between hash codes, different platform configurations and forensic teardown analysis may be used to associate one or more hash codes with particular corrective actions that are selected or otherwise determined by technicians and/or automated error analysis logic. In one exemplary embodiment, previously-determined error hash corrective actions may be downloaded to deployed information handling systems so that, upon detection of an error hash, look up and take the corrective actions if a detected error hash matches a corrective action. By providing detailed data across plural deployed platforms of detected error hashes, statistically more significant accurate error or fault detection and correction may be economically provided to improve fault management for information handling system end users.

In one embodiment, the disclosed methods and systems may be implemented to track and analyze system hang events that occur in the field across multiple information handling system platforms to effectively and consistently provide repeatable system hang event failure analysis. A closed loop analytic approach to system hang events may also be employed to efficiently collect data collection related to system hang events and provide statistically significant system hang relations across hardware platforms. In one embodiment, quicker and more accurate identification of root cause for field system hang events may be provided to allow more rapid corrective actions to address identified failures. For example, software-related fixes may be updated to deployed information handling systems to address causes of system hang events. Thus, once a root cause of a system hang event is detected, full detection of the extent of the root cause may become possible across different information handling system platforms.

In one respect, disclosed herein is an information handling system, including: an in-band host processing device configured to execute a host operating system (OS); an out-of-band processing device separate from the in-band host processing device, the out-of-band processing device being coupled in data communication with the in-band host processing device; and non-volatile memory (NVM) coupled in data communication with the in-band host processing device and the out-of-band processing device; where the out-of-band processing device is coupled to detect and respond to an indication of a system hang event occurring on the in-band host processing device during in-band execution of the OS by causing the in-band host processing device to generate fault information from system context information of the host in-band processing device at the time of the system hang event and to save the generated fault information to the NVM.

In another respect, disclosed herein is a method, including executing a host operating system (OS) on an in-band host processing device of an information handling system; and using an out-of-band processing device of the information handling system that is separate from the in-band host processing device to: monitor for indication of a system hang event occurring on the in-band host processing device during in-band execution of the OS, detect an indication of a system hang event occurring on the in-band host processing device during in-band execution of the OS, and respond to the detected indication of the system hang event by communicating with the in-band host processing device to cause the in-band host processing device to generate fault information from system context information of the host in-band processing device at the time of the system hang event and to save the generated fault information to the NVM.

DESCRIPTION OF ILLUSTRATIVE EMBODIMENTS

Figure 1:
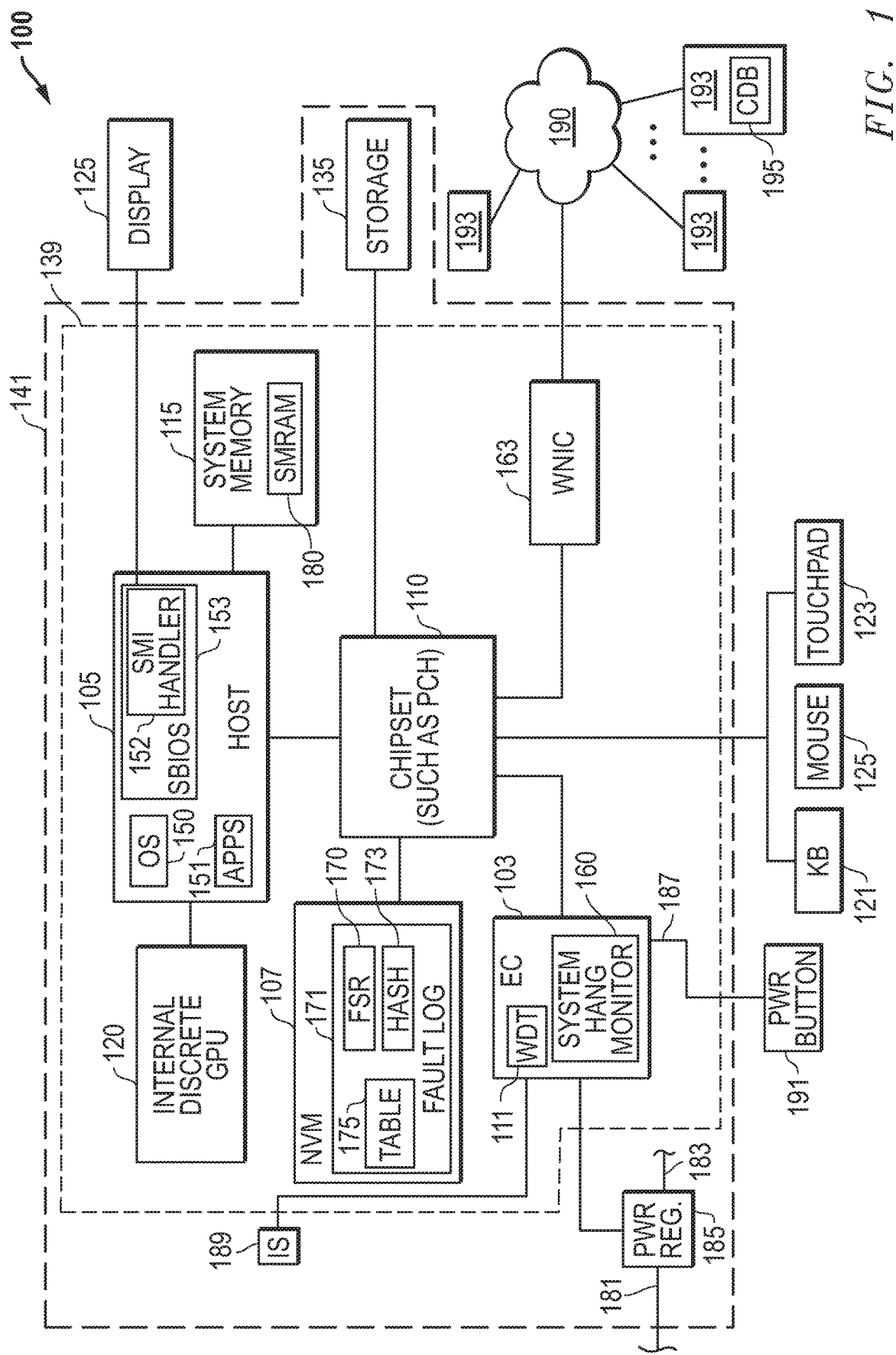
FIG. 1 illustrates a simplified block diagram of an information handling system according to one exemplary embodiment of the disclosed methods and systems.

FIG. 1 is a block diagram illustrating an information handling system 100 as it may be configured to according to one exemplary embodiment of the disclosed methods and systems. In one embodiment, portable information handling system 100 may be a battery-powered portable information handling system that is configured to be optionally coupled to an external source of system (DC) power, for example AC mains and an AC adapter. Such a portable information handling system may also include an internal DC power source (e.g., smart battery pack and/or power regulation circuitry 185) that is configured to provide system power 183 for powering the system load of information handling system, e.g., when an external source of system power is not available or not desirable. Examples of portable information handling systems include, but are not limited to, a notebook or laptop computer, tablet computer, smart phone, convertible computer, etc. Further information on portable information handling system architecture and components may be found in U.S. patent application Ser. No. 15/587,103 filed May 4, 2017 which is incorporated herein by reference in its entirety for all purposes.

In another exemplary embodiment, information handling system 100 may be an AC-powered or non-portable computer such as desktop computer, tower computer, all-in-one computer, etc. Further information on non-portable or non-battery powered information handling system architecture and components may be found in United States Patent Application Publication Number 20140281618A1, which is incorporated herein by reference in its entirety for all purposes. It will also be understood that the particular configuration of FIG. 1 is exemplary only, and that an information handling system may be configured with fewer, additional or alternative components than those illustrated and described herein.

As shown in FIG. 1, information handling system 100 of this exemplary embodiment includes various integrated components that are embedded on a system motherboard 139, it being understood that any one or more of such embedded components may be alternatively provided separate from motherboard 139 within a chassis enclosure housing 141 of an information handling system, e.g., such as provided on a daughter card or other separate mounting configuration. In FIG. 1, an in-band host processing device 105 is provided on motherboard 139, e.g., as a central processing unit CPU such as an Intel Haswell processor, an Advanced Micro Devices (AMD) Kaveri processor, or one of many other suitable processing devices currently available. In this embodiment, host processing device 105 may execute a host operating system (OS) 150 for the portable information handling system, one or more applications 151, and system BIOS (SBIOS) 153 that includes a system management interrupt (SMI) handler 152 or system management mode (SMM) code that is configured to implement a system management mode (SMM) during which OS 150 and other normal execution by host processing device is suspended.

Still referring to FIG. 1, system memory integrated on motherboard 139 may include main system memory 115 (e.g., volatile random access memory such as DRAM or other suitable form of random access memory) coupled (e.g., via DDR channel) to an integrated memory controller of host processing device 105 to facilitate memory functions, although it will be understood that a memory controller may be alternatively provided as a separate chip or other circuit in other embodiments. In the embodiment of FIG. 1, host processing device 105 itself may include an integrated GPU and information handling system 100 may also include an optional separate internal discrete GPU 120. In one mode of operation, video content from CPU 105 may be sourced at any given time either by an integrated GPU of host processing device 105 or from internal discrete GPU 120 of information handling system 100. Peripheral Component Interconnect Express (PCI-e) is just one example of a suitable type of data bus interface that may be employed to route graphics data between motherboard 139 and/or internal components of information handling system 100.

As further illustrated in FIG. 1, host processing device 105 may be coupled via direct media interface (DMI) or other suitable data bus to a chipset 110 (e.g., such as an embedded platform controller hub (PCH)) integrated on motherboard 139 which may be present to facilitate input/output functions for the host processing device 105 with various other components of information handling system 100. In this exemplary embodiment, chipset 110 is shown coupled to other embedded or integrated components on a motherboard 139 that include system out-of-band embedded controller 103 (e.g., used for real time detection of events, etc.), non-volatile memory (NVM) 107 (e.g., storing BIOS, firmware or other programming that may be used by EC 103 to implement power management settings, etc.), and wireless network card (WNIC) 163 for Wi-Fi or other wireless communication with other devices and information handling systems 193 via a network 190 (e.g., such as Internet, corporate intranet, etc.). In one embodiment, one or more of systems 193 may have a similar configuration of processing devices and other components as has information handling system 100, although this is not necessary.

As shown in FIG. 1, NVM 107 may also contain a fault signature record (FSR) 170 created and stored via chipset 110 and serial peripheral interface (SPI) bus or other suitable data bus by host processing device 105 from host processing device context information in save state region of system management RAM (SMRAM) 180. This context information is first created on system memory 115 by host processing device 105 during SMM mode implemented by SMI handler 152, e.g., in response to a system management interrupt (SMI) provided across an enhanced serial peripheral interface (eSPI) bus or other suitable data bus by EC 103. In this embodiment, EC 103 may be configured to implement a system hang monitor 160 which will be described further herein. Further information regarding possible functionality and tasks that may be implemented by EC 103 and/or chipset 110 may be found described in U.S. patent application Ser. No. 15/261,168 filed Sep. 9, 2016, which is incorporated herein by reference in its entirety for all purposes.

Other integrated components of motherboard 139 which are not shown but which may be present and coupled to chipset 110 include, a touchpad microcontroller, keyboard microcontroller, audio codec, audio amplifier, etc. One or more other components of information handling system 100 that are separate from (and not integrated with) motherboard 139 may also be coupled via motherboard circuitry to chipset 110 including, but not limited to, display 125 (e.g., LCD or LED flat panel display coupled by HDMI, DVI, SVGA, VGA, etc.), user input devices (e.g., keyboard 121, touchpad 123, mouse 125 coupled by universal serial bus (USB)), and system storage 135 which may be a local serial ATA (SATA) hard drive storage or other suitable type of storage including solid state drive (SSD), optical drive/s, NVRAM, Flash, etc. In a portable information handling system embodiment, one or more components may be at least partially integrated within a chassis enclosure housing 141 (e.g., sheet metal and/or plastic enclosure housing), e.g., such as keyboard 121, display 125 and touchpad 123.

As further shown in FIG. 1, information handling system 100 is configured to receive external AC or DC power 181 which is converted and/or regulated in power regulation circuitry 185 to provide regulated system DC power 183 to power the various power-consuming components of information handling system. An external power button 191 may be provided to allow a user to manually power-off and power-on components of the information handling system 100 by manually actuating (e.g., pressing) the power button 191 to provide a power signal 187 to EC 103, which is configured to respond to the provided power signal 187 by controlling power regulation circuitry button 191 to turn on or turn off system DC power 183 depending on the current operating state of the information handling system 100, e.g., in a toggle on/toggle off manner. In one embodiment, EC 103 may employ a timer to measure a duration of power signal 187 and to implement a threshold delay period that requires a user to continuously actuate the power button 191 for a defined threshold time (e.g., such as four seconds, or other selected greater or lesser time predefined time value) before the EC 103 turns off system DC power 183. In this way a user may manually override processing device operations occurring within information handling system 100 in order to shut down system 100, e.g., such as in the case of a system hang occurrence where host processing device 105 has stopped responding to user input. A chassis intrusion switch 189 may also be optionally present as shown to be activated to provide a signal to EC 103 upon opening of chassis enclosure housing 141, e.g., intrusion switch 189 may be mechanically coupled to a chassis door or access panel of chassis enclosure housing 141 to detect opening of the door or panel and provide a signal to EC 103 upon such opening.

As shown in FIG. 1, EC 103 may also maintain a watchdog timer (WDT) 111 that is regularly reset before it expires by signal "pings" provided from the host processing device 105 while host processing device 105 is operating normally. However, when regular pings from host processing device 105 are not received (e.g., such as during a system hang event occurrence), WDT 111 will expire and EC 103 will initiate operations to reset the host processing device 105, e.g., by rebooting the host processing device 105 and US 150. Further information on watchdog timer implementation and operation may be found in U.S. patent application Ser. No. 15/726,119 filed Oct. 5, 2017, which is incorporated herein by reference in its entirety for all purposes.

Figure 2A:
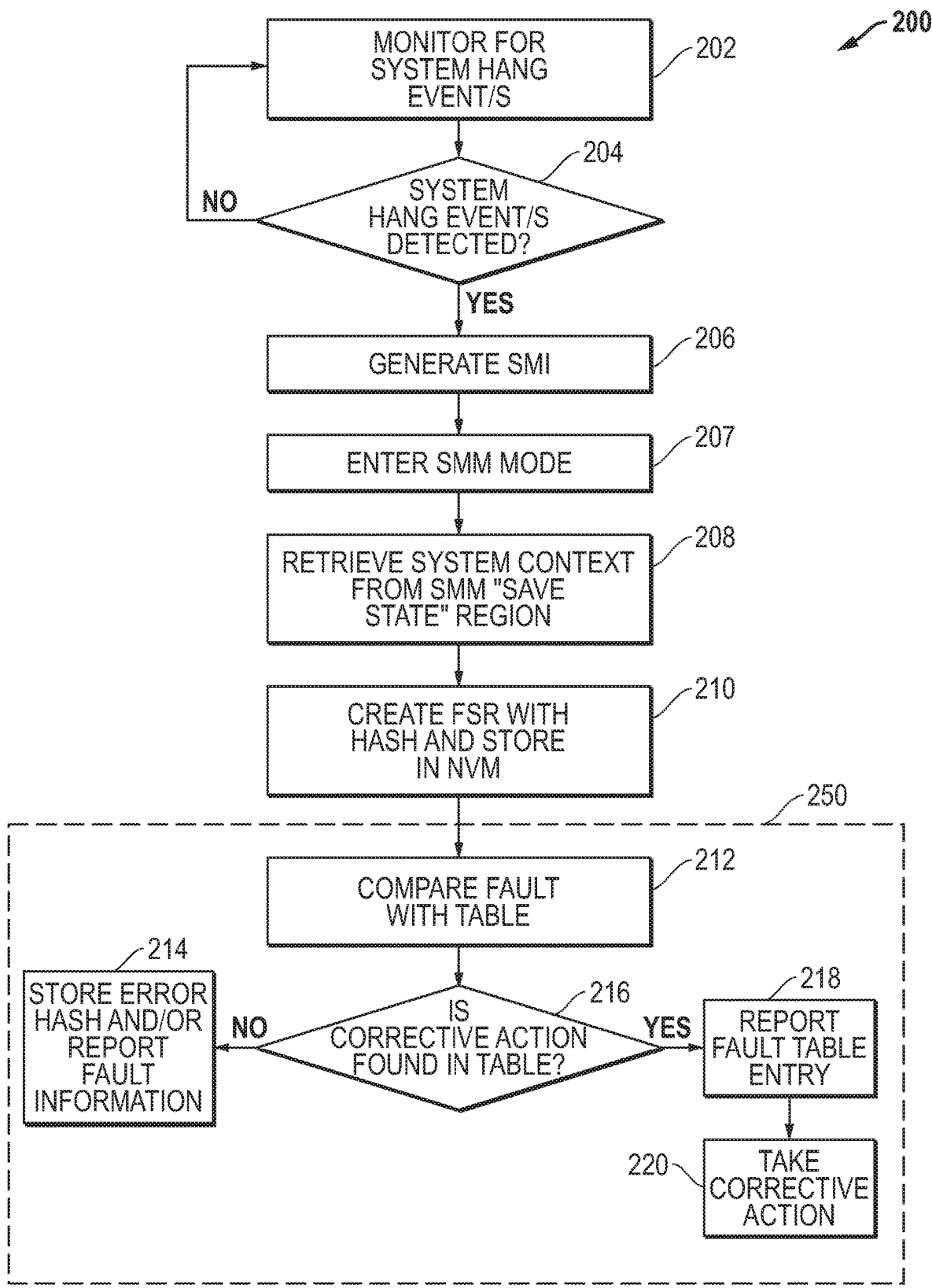
FIG. 2A illustrates methodology according to one exemplary embodiment of the disclosed methods and systems.
Figure 3:
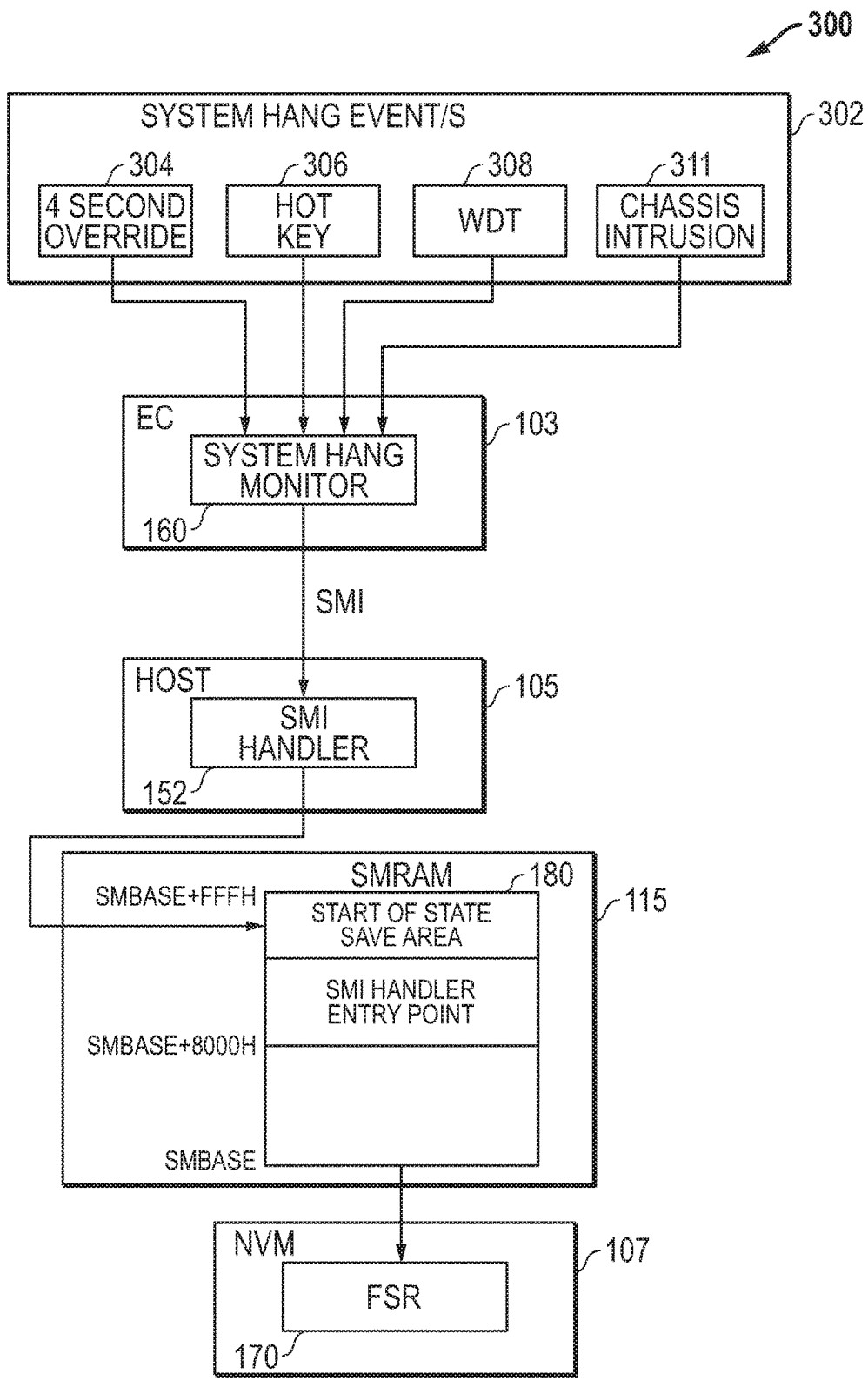
FIG. 3 illustrates interaction between information handling system components according to one exemplary embodiment of the disclosed methods and systems.

FIG. 2A illustrates one exemplary embodiment of a methodology 200 that may be implemented to create a fault signature record (FSR) 170 on NVM 107 in response to occurrence of one or more system hang event indications 302 such as illustrated in FIG. 3. FIG. 3 in turn illustrates one exemplary embodiment of interaction 300 between various components of information handling system 100 according to the exemplary methodology 200 of FIG. 2A. Although methodology 200 is described in relation to the embodiment of FIG. 3, it will be understood that FIG. 3 is exemplary only, and that methodology 200 may be implemented by any alternative combination of one or more processing devices and memory and/or storage devices of an information handling system that is suitable for creating a FSR 170 or other type of log of system faults that occur coincident with a host processing device system hang event/s.

As shown in FIG. 2A, methodology 200 begins in step 202 where system hang monitor 160 is executing on EC 103 to continuously monitor for system hang event indications 302 that are indicative of the occurrence of a host processing device system hang event in which one or more of applications 151 and/or OS 150 executing on host processing device 105 have ceased to respond to user input and/or have otherwise stopped operating normally as described elsewhere herein. Such indications 302 may generated, for example, by a user who observes or otherwise experiences the system hang event behavior and/or may be generated automatically, e.g., by EC 103 or other out-of-band processing device. Examples of indications 302 of a system hang event occurrence include, but are not limited to user input and/or automated action by one of the system processing devices, e.g., a receipt of power signal 187 in response to a user actuated power button override action 304 (e.g., power button pressed by user for four seconds or other predefined greater or lesser power-off threshold time period), or upon user entry via keyboard 121 of designated debug hot key input/s 306 (e.g., such as one or more designated QWERTY keyboard keys like simultaneous press of Shift, Ctrl, and F12 keys), upon occurrence of a watchdog timer event 308, (e.g., WDT time out without receiving ping from the host processing device 105), chassis intrusion switch activation 311 due to attempted repair of the information handling system 100, etc. If no system hang event is detected in step 204, then methodology 200 returns to step 202 and repeats as before. However, if a system hang event is detected in step 204 by system hang monitor 160, then methodology 200 proceeds to step 206 where firmware in EC 103 generates and provides a unique designated SMI to SMI handler 152 of host processing device 105 while host processing device is in a system hang state as shown in FIG. 3. SBIOS 153 responds to receipt of the SMI by SMI handler 152 by taking control of host processing device 105 that is in the system hang state and entering SMM mode in step 207.

During operation of host processing device 105, system context of host processing device 105 may be created and/or updated in SMM "save state" region of SMRAM 180 of system memory 115. Examples of such system context information includes, but is not limited to, information regarding location in processing device code where system hang is occurring such as host processing device (e.g., CPU) registers, assembly instruction pointer (e.g., in the CPU registers), stack frame, etc. Upon entering SMM mode of step 207, SBIOS 153 is configured in step 208 to retrieve or extract from SMRAM 180 at least a portion of the current host processing device system context information corresponding to (existing at the time of) receipt of the SMI and therefore the detected system hang event indicated by system hang event indicator/s 302. Examples of such system context information that may be extracted and collected in step 208 from SMRAM 180 includes, but is not limited to, failing instruction pointer, CPU registers, and stack frame. In step 210, SBIOS 153 may create a fault signature record (FSR) 170 that includes the collected data of step 208, and store this created FSR 170 in a fault log region 171 of NVM 107 so that the system hang event fault information is available for subsequent extraction. For example, if the host processing device 105 returns to normal operation or successfully boots to the OS 150 after occurrence of the system hang event, the fault information may be sent by network 190 to a remotely and/or centrally maintained fault database 195 on another information handling system 193 for analysis.

In one embodiment, SBIOS 153 may also store system hang fault information in a repeatable manner so that the same system hang fault on the same information handling system hardware platform will generate the same error message. For example, system hang event monitor 160 may also generate a unique error hash 173 in step 210 from information associated with the system hang fault. The error hash 173 may be generated to provide a fault signature record 170 and error hash 173 that is repeatedly generated from the same system hang fault conditions, thus allowing comparison of the fault signature against a fault table 175 (e.g., lookup table) having corrective actions for detected fault signatures as described further herein. In this regard, SBIOS may store the error hash 173 together with the FSR 170 in a fault log 171 on NVM 107 to uniquely identify the system hang event fault/s, e.g., for processing devices such as Intel processor architectures a hash may be created and stored that includes information associated with and/or uniquely identifying the source of the fault such as such as the instruction module and offset associated with the system hang fault, central processing unit (CPU) machine check architecture (MCA) model specific registers (MSR) associated with the system hang fault (e.g., cache errors, system bus errors, ECC errors, parity errors, translation lookaside buffer errors, etc.), identifier of one or more hardware component/s of the information handling system 100 (e.g., within chassis enclosure 141) associated with the system hang fault, non-maskable interrupt (NMI) generated from failure of a PCIe device or other hardware device associated with the system hang fault, other information associated with the system hang fault, etc.

For example, system hang event monitor 160 may generate error hash codes using a predefined set of fault information with a goal of creating an identical hash code each time the fault is detected. In some embodiments, identical error hash codes may be created across different hardware platforms so that the same error hash will relate across different hardware platforms. Alternatively, error hash codes may be analyzed and related across different hardware platforms when communicated to a centralized fault database 195. Increasing the number of fault occurrences detected for a given fault by including analysis across different hardware platforms may provide an increased statistical basis for detecting and correcting otherwise infrequent faults. To generate a common hash, system hang event monitor 160 may include information that is repeatedly involved with a detected fault. Further, different levels of specificity may be used for FSR and hash creation depending upon whether cross-platform analysis of faults will be emphasized for the hardware platform in question. For example, a more generalized fault signature may be provided so that when hashed cross platform analysis is more easily performed; alternatively, more narrow fault signatures may be provided so that the created hash reduces the risk of multiple different types of system hang faults generating a common error hash.

Once stored in NVM 107, FSR 170 and its hash 173 remain with the NVM 107 on the motherboard 139, e.g., even if the motherboard 139 is removed from the other components and chassis enclosure housing 141 of the information handling system 100. Thus, if information handling system 10 does not successfully boot or otherwise return to an operational state, FSR 170 may be read in the field or upon return of information handling system 100 to a repair facility, e.g., by direct interaction with motherboard 12. Thus, in one embodiment methodology 200 may terminate after step 210, at which time NVM 107 on motherboard 139 may be directly accessed and FSR 170 and/or its hash 173 read by direct interaction with motherboard 139 by a field technician or technician at a repair facility to subsequently extract system hang fault information and determine the identity and/or cause of the system hang fault event/s so that corrective action may be taken. Analysis and repair of motherboard 139 such as described above may occur whether or not the information handling system 100 continues operating or successfully reboots to the OS 150 after the system hang event, or is not capable of successfully rebooting after the system hang event 302.

Returning to FIG. 2A, detected faults may be managed and additional optional corrective actions may be optionally taken by SBIOS 153 after completion of step 210 where FSR 170 and its hash 173 are stored in NVM 107. Examples of fault management steps and corrective action steps that may be taken for detected system hang faults include the same fault management and corrective action steps taken for detected pre-boot faults as described in U.S. patent application Ser. No. 15/261,168 filed Sep. 9, 2016, which is incorporated herein by reference in its entirety for all purposes.

In one embodiment, optional steps 212-220 enclosed in dashed box 250 of FIG. 2A may be taken by SBIOS 153 after reboot of information handling system 100 following completion of step 210 where FSR 170 and its hash 173 are stored in NVM 107. At the next system boot, system hang monitor 160 may look up characteristics of the given error hash 173 in a database of fault table 175 (e.g., lookup table) stored in fault log 171 on NVM 107. If the same error hash already exists in the database of table 175 together with associated corrective action/s and determined root cause/s for the current system fault, system hang monitor 160 may look up a corrective action to perform in response to the current error hash 173 and/or root cause information for display to a user, e.g., on display 125 of system 100. This comparison may occur in step 212 where the error hash 173 generated from other fault information is compared with a database of a fault table 175 that may also be stored in NVM fault log 171 to determine in step 216 if root cause of the fault has been previously identified and if any corrective actions are already stored in association with the same error hash. For example, if a system hang fault corresponds to an infinite loop or uninterruptible lengthy computation corresponding to a an operating system, driver or software application code logic error, the NVM fault log 171 may include a pointer to a corrective action that includes downloading an update to the operating system, driver or application code that corrects the problem. As another example, if a system hang fault corresponds to unavailable resources for a given process executed by the host processing system, the NVM fault log 171 may include a pointer to a corrective action that includes reserving additional processing resources for the affected given process to ensure sufficient resources are available.

If a fault table entry (e.g., with root cause) and stored corrective action matching the error hash 173 is found in step 216, then the matching fault table entry identifying the system hang fault may be reported at step 218 across network 190 for tracking at a remote location (e.g., for addition to a database of fault table 175 maintained at a remote information handling system 193), and at step 220 the corrective action is implemented. During step 218 or 220, an optional message may also be displayed or otherwise communicated to the user that gives the user specific information regarding the cause of the fault, e.g., which system hardware component failed, memory dam, etc. For example, if a particular type of system hang event fault is detected in step 204 and is found to have a particular associated corrective action in step 216, then table 175 and/or local fault database of fault table 175 of NVM 107 may be configured to include a pointer to the corrective action instructions. In one embodiment, for fault table entry reporting in step 218, the fault table 175 may maintain a circular buffer that is available for download through a network interface or by a direct connection with the motherboard 139.

However, if no existing fault table entry (e.g., with root cause) and stored corrective action is found in step 216 that matches the current error hash 173, then methodology 200 proceeds to step 214 where the error hash 173 is stored in the fault log 171 to be available for subsequent analysis when the log is read. For example, after recovery or next boot of the information handling system, the fault log 171 may be read and the error hash 173 and/or FSR 170 or other fault information forwarded across network 190 to an information handling system 193 at another network location (e.g., service center) for analysis as described further herein. Assuming the current fault is non-fatal, upon next system boot a generic user message may be displayed or otherwise communicated to a user during step 214 that notifies the user that an unknown fault has been detected and instructing the user to check for downloadable updates now and in the future. If the current fault is fatal and information handling system 100 fails to boot, the error hash 173 is available for direct extraction from NVM 107 by a field technician or upon return of the information handling system 100 to a service center. In some instances, an intermittent fault may result in the same error code (FSR 170, Hash 173, etc.) being stored in the fault log without a corrective action available to fix the fault. In such a situation, the end user may be provided with notice of the intermittent fault (e.g., displayed message on display 125) so that the end user may seek repair before a fatal fault causes the system to fail.

Figure 2B:
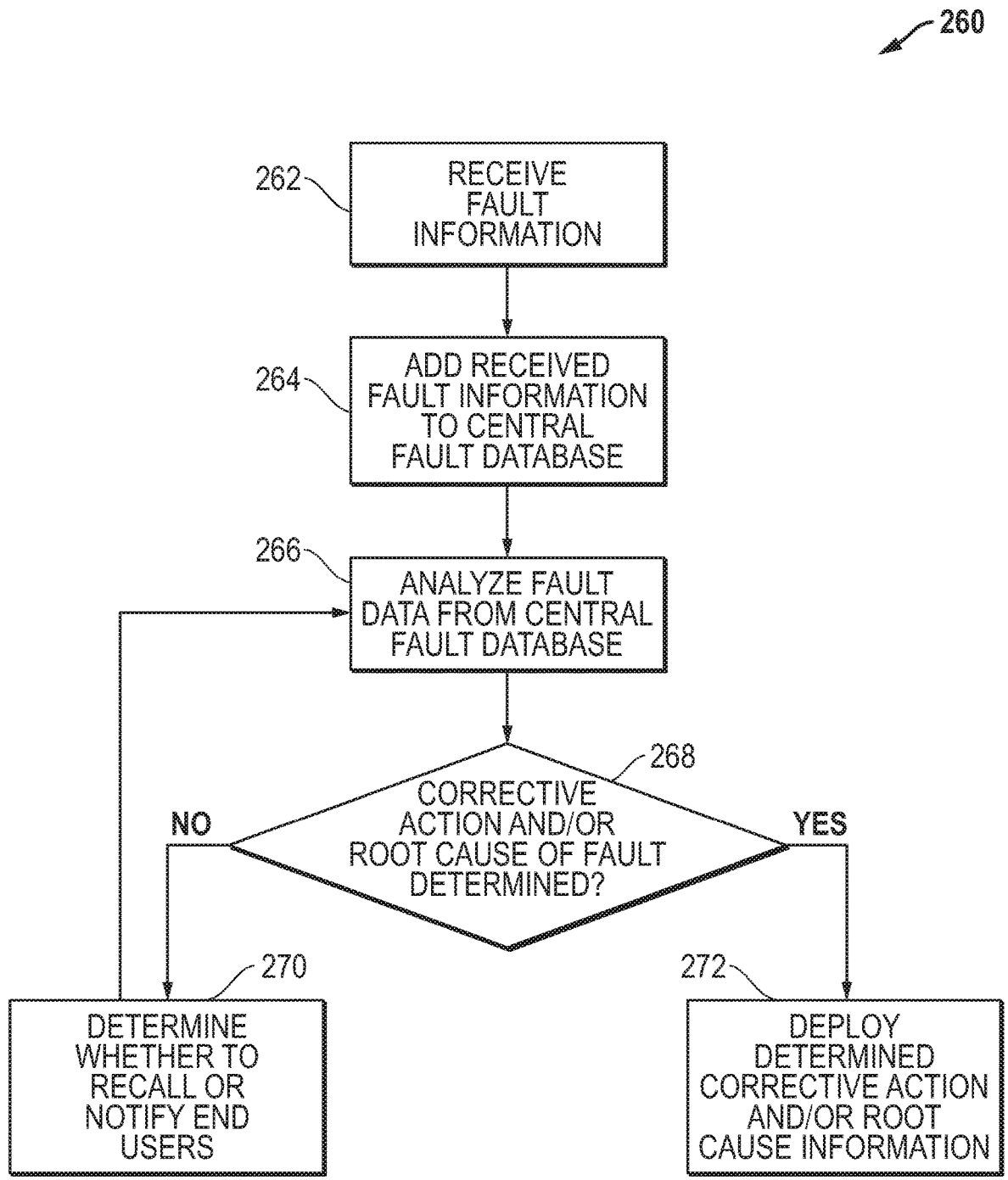
FIG. 2B illustrates methodology according to one exemplary embodiment of the disclosed methods and systems.

FIG. 2B illustrates steps of a methodology 260 that may be performed according to one exemplary embodiment of the disclosed methods and systems, e.g., following step 214 of FIG. 2A in which no corrective action or root cause is found in a fault table 175 of system 100. In one embodiment methodology 260 may be performed by one or more processing device/s (e.g., host processing devices) of a remote information handling system 193 such as a server to implement a network-based system to analyze and correct system hang faults among distributed information handling systems that include information handling system 100, for example, using one or more steps of the methodology described for handling pre-boot errors in U.S. patent application Ser. No. 15/261,168 filed Sep. 9, 2016, which is incorporated herein by reference in its entirety for all purposes.

As shown in FIG. 2A, methodology 260 begins in step 262 with receipt of fault information (e.g., error hash 173, FSR 170, etc.) at a remote information handling system 193 from one or more other information handling systems 100 (e.g., that are deployed in the field), e.g., via automatic upload to a remote system 193 across network 190 upon the next boot of system 100. Remote system 193 may be maintained at a service center or other remote service or administration location. Alternatively, fault information (e.g., FSR 170, hash 173, etc.) may be retrieved in step 262 during forensic analysis by direct extraction of this information from NVM 107 of motherboard 139, e.g., by a technician or other service personnel in the field or at a service center in the case where the current system hang fault is fatal and a reboot of system 100 is not possible. A forensic evaluation may also provide additional information related to the root cause of the current system hang fault for application with similar reported or received error hashes.

Next, at step 264, received error hash and optional related FSR information that is received from system 100 and other different information handling systems may be stored in a centralized fault database 195, e.g., that is maintained in storage or NVM on remote system 193. In addition to the error hash 173, complete FSR 170 data and other information such as information handling system platform identifier and/or other unique identification information may be stored in the central fault database 195 to allow a relationship of hardware from a hardware database to the error hash for more in depth analysis. In step 266, fault analysis may be performed, e.g., using a fault analytics engine such as described U.S. patent application Ser. No. 15/261,168 filed Sep. 9, 2016, which is incorporated herein by reference in its entirety for all purposes. Such a fault analysis may include applying "big data" statistical analysis in order to relate error hashes with root cause faults and corrective actions. For example, in one embodiment, different hash codes may be related to common root cause faults by considering other identifying information, such as platform identifiers and hardware components included in information handling systems that report error hashes. Generally, the greater the amount of related information available for analysis, the greater the statistical odds that a particular fault with relatively low incidence may be isolated and associated with corrective action. In one exemplary embodiment, the competing constraints for fault analysis of step 266 and system hang monitor 160 may be to provide a narrow error hash generation that sufficiently identifies an fault so that recreation of the error hash allows application of a particular corrective action, and a broad enough error hash generation so that failure related to the same root cause will have the same error hash even though the fault manifests in different manners across different platforms of hardware and software configurations.

Still referring to FIG. 2B, if after analysis it is determined in step 268 that the fault information (e.g., hash 173 or FSR 170) of the analyzed current system hang fault does not have a deployable corrective action and the root cause cannot be determined, then methodology 260 proceeds to step 270 where it is determined whether to recall systems 100 affected by the current system hang fault and/or to notify the end users of such systems (e.g., that no corrective action is currently available but will provided when available), depending upon the severity with which the fault manifests, and methodology may repeat to step 266. However, once root cause of a system hang and/or corresponding corrective action has been determined by analysis of step 266 for a given system fault and its corresponding error hash 173, then methodology 268 proceeds to 272 where the determined corrective action may be deployed across network 190 to the information handling system/s 100, e.g., as a database for fault table 175 or database update that includes the error hash 173 and associated corrective action for inclusion in the fault table 175 stored in fault log 171 on NVM 107.

It will be understood that the steps of FIGS. 2A and 2B are exemplary only, and that any combination of fewer, additional and/or alternative steps may be employed that are suitable for detecting, identifying and/or correcting system hang events.

It will also be understood that one or more of the tasks, functions, or methodologies described herein (e.g., including those described herein for components 103, 105, 110, 120, 163, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An information handling system, comprising:
   an in-band host processing device configured to execute a given host operating system (OS) and to execute a system basic input/output system (SBIOS);
   an out-of-band processing device separate from the in-band host processing device, the out-of-band processing device being coupled in data communication with the in-band host processing device; and
   non-volatile memory (NVM) coupled in data communication with the in-band host processing device and the out-of-band processing device;
   where the out-of-band processing device is coupled to detect and respond to an indication of a system hang event occurring on the in-band host processing device during in-band execution of the given host OS by causing the SBIOS to generate fault information from system context information of the host in-band processing device at the time of the system hang event and to save the generated fault information to the NVM;
   where the generated fault information comprises at least one fault signature record (FSR) and corresponding hash that is repeatedly generated from the same system hang fault condition.

2. The information handling system of claim 1, where the indication of a system hang event comprises at least one of a user input or an automated action taken by a processing device of the information handling system.

3. The information handling system of claim 2, where the indication of a system hang event comprises at least one of:
   a user input that is at least one of a user-actuated power button override signal, user entry of at least one designated hot key, or chassis intrusion switch activation; or
   an automated action taken by a processing device of the information handling system that comprises a watchdog timer event.

4. The information handling system of claim 1, where the out-of-band processing device is programmed to respond to the indication of a system hang event occurring during in-band execution of the given host OS by providing a designated system management interrupt (SMI) to the in-band host processing device while the in-band host processing device is in a system hang state; and where the SBIOS executing on the in-band host processing device is programmed to respond to receipt of the designated SMI by entering system management mode (SMM) and generating the fault information from system context information and saving the generated fault information to the NVM during SMM.

5. The information handling system of claim 4, where the SBIOS executing on the in-band host processing device is programmed to respond to receipt of the designated SMI by retrieving the system context information from system management random access memory (SMRAM); generating fault information from the system context information that includes the hash that comprises information associated with a source of a system hang fault corresponding to the system hang event, and saving the generated hash with the fault information to the NVM.

6. The information handling system of claim 5, where the hash comprises at least one of an instruction module and an offset associated with the system hang fault, one or more machine check architecture (MCA) model-specific registers (MSR) associated with the system hang fault, an identifier of a hardware component of the information handling system that is associated with the system hang fault, or a non-maskable interrupt (NMI) generated from failure of a PCIe device associated with the system hang fault.

7. The information handling system of claim 5, further comprising a fault table stored in the NVM, the fault table comprising multiple different hashes corresponding to respective different corrective actions to be taken to address respective causes of different system hang faults; and where the out-of-band processing device is programmed to compare a given hash generated in response to occurrence of a given detected system hang event with the multiple different hashes stored in the fault table to determine and apply a corrective action that corresponds to one of the fault table hashes that matches the given hash of the detected system hang fault.

8. The information handling system of claim 5, further comprising a fault table stored in the NVM, the fault table comprising multiple different hashes corresponding to respective different corrective actions to be taken to address respective causes of different system hang faults; and where the where the SBIOS executing on the in-band host processing device is programmed to respond to a reboot of the information handling system after the saving of the generated hash with the fault information to the NVM by then comparing a given hash generated in response to occurrence of a given detected system hang event with the multiple different hashes stored in the fault table to determine information regarding the cause of the fault, and then communicating the determined information regarding the cause of the fault to the system user.

9. The information handling system of claim 1, where the fault information comprises a location in processing device code where the system hang event occurred.

10. The information handling system of claim 9, where the fault information comprises at least one of host processing device registers, assembly instruction pointer, or stack frame.

11. The information handling system of claim 1, where the out-of-band processing device is programmed to retrieve the fault information from the NVM of the information handling system, and to provide the retrieved fault information across a network to a separate and different information handling system.

12. The information handling system of claim 1, where the indication of a system hang event comprises a user input.

13. The information handling system of claim 12, where the indication of a system hang event comprises a user input that is at least one of a user-actuated power button override signal, user entry of at least one designated hot key, or chassis intrusion switch activation.

14. A method, comprising:
executing a given host operating system (OS) and a system basic input/output system (SBIOS) on an in-band host processing device of an information handling system; and
using an out-of-band processing device of the information handling system that is separate from the in-band host processing device to:
monitor for indication of a system hang event occurring on the in-band host processing device during in-band execution of the given host OS,
detect an indication of a system hang event occurring on the in-band host processing device during in-band execution of the given host OS, and
respond to the detected indication of the system hang event by communicating with the in-band host processing device to cause the SBIOS to generate fault information from system context information of the given host in-band processing device at the time of the system hang event and to save the generated fault information to non-volatile memory (NVM);
where the generated fault information comprises at least one fault signature record (FSR) and corresponding hash that is repeatedly generated from the same system hang fault condition.

15. The method of claim 14, where the indication of a system hang event comprises at least one of a user input or an automated action taken by a processing device of the information handling system.

16. The method of claim 15, where the indication of a system hang event comprises at least one of:
a user input that is at least one of a user-actuated power button override signal, user entry of at least one designated hot key, or chassis intrusion switch activation; or
an automated action taken by a processing device of the information handling system that comprises a watchdog timer event.

17. The method of claim 14, further comprising:
responding to the indication of a system hang event occurring during in-band execution of the given host OS by providing a designated system management interrupt (SMI) from the out-of-band processing device to the in-band host processing device while the in-band host processing device is in a system hang state; and
responding to receipt of the designated SMI at the in-band host processing device by entering system management mode (SMM) on the in-band host processing device and generating the fault information from system context information and saving the generated fault information to the NVM during SMM.

18. The method of claim 17, further comprising using the SBIOS executing on the in-band host processing device to respond to receipt of the designated SMI by retrieving the system context information from system management random access memory (SMRAM), generating fault information from the system context information that includes the hash that comprises information associated with a source of a system hang fault corresponding to the system hang event, and saving the generated hash with the fault information to the NVM.

19. The method of claim 18, further comprising using the out-of-band processing device to compare a given hash generated in response to occurrence of a given detected system hang event with a fault table on NVM that comprises multiple different hashes corresponding to respective different corrective actions to be taken to address respective causes of different system hang faults, and to select and apply a corrective action that corresponds to a one of the fault table hashes that matches the given hash of the detected system hang fault.

20. The method of claim 14, where the fault information comprises a location in processing device code where the system hang event occurred.

21. The method of claim 14, where the out-of-band processing device and host in-band processing device are components of a first information handling system; and where the method further comprises retrieving the fault information from the NVM and providing the retrieved fault information to a second and different information handling system.

22. The method of claim 21, where the retrieved fault information comprises a hash that includes information associated with the source of a system hang fault corresponding to the system hang event; and where the method further comprises storing the received hash together with hashes received from other information handling systems in a centralized fault database maintained on the second information handling system; associating one or more of the hashes in the central fault database with a corresponding corrective action, in the central fault database, to be taken to address a respective cause of a corresponding system hang fault, and deploying the associated hashes and corrective actions of the central fault database across a network to store the associated hashes and corrective actions in a fault table on a NVM that comprises multiple different hashes corresponding to respective different corrective actions to be taken to address respective causes of different system hang faults.

23. The method of claim 22, further comprising using the out-of-band processing device to compare a given hash generated in response to occurrence of a given detected system hang event with the fault table on the NVM that comprises multiple different hashes corresponding to respective different corrective actions to be taken to address respective causes of different system hang faults, and to select and apply a corrective action that corresponds to one of the fault table hashes that matches the given hash generated in response to occurrence of the given detected system hang event.

24. The method of claim 14, where the indication of a system hang event comprises a user input.

25. The method of claim 24, where the indication of a system hang event comprises a user input that is at least one of a user-actuated power button override signal, user entry of at least one designated hot key, or chassis intrusion switch activation.

26. A method, comprising:
executing a given host operating system (OS) and a system basic input/output system (SBIOS) on an in-band host processing device of an information handling system; and
using an out-of-band processing device of the information handling system that is separate from the in-band host processing device to:
monitor for indication of a system hang event occurring on the in-band host processing device during in-band execution of the given host OS, detect an indication of a system hang event occurring on the in-band host processing device during in-band execution of the given host OS, and respond to the detected indication of the system hang event by communicating with the in-band host processing device to cause the SBIOS to generate fault information from system context information of the given host in-band processing device at the time of the system hang event and to save the generated fault information to non-volatile memory (NVM);

where each of the in-band processing device, out-of-band processing device, and NVM are integrated on a same system motherboard of the information handling system; and where the out-of-band processing device is an embedded controller that implements power management settings for the information handling system.

27. A method, comprising:

executing a given host operating system (OS) and a system basic input/output system (SBIOS) on an in-band host processing device of an information handling system; and using an out-of-band processing device of the information handling system that is separate from the in-band host processing device to:

monitor for indication of a system hang event occurring on the in-band host processing device during in-band execution of the given host OS, detect an indication of a system hang event occurring on the in-band host processing device during in-band execution of the given host OS, and respond to the detected indication of the system hang event by communicating with the in-band host processing device to cause the SBIOS to generate fault information from system context information of the given host in-band processing device at the time of the system hang event and to save the generated fault information to non-volatile memory (NVM);

responding to the indication of a system hang event occurring during in-band execution of the given host OS by providing a designated system management interrupt (SMI) from the out-of-band processing device to the in-band host processing device while the in-band host processing device is in a system hang state; and responding to receipt of the designated SMI at the in-band host processing device by entering system management mode (SMM) on the in-band host processing device and generating the fault information from system context information and saving the generated fault information to the NVM during SMM;

using the SBIOS executing on the in-band host processing device to respond to receipt of the designated SMI by retrieving the system context information from system management random access memory (SMRAM), generating fault information from the system context information that includes a hash that comprises information associated with a source of a system hang fault corresponding to the system hang event, and saving the generated hash with the fault information to the NVM; and using the SBIOS executing on the in-band host processing device to respond to a reboot of the information handling system after the saving of the generated hash with the fault information to the NVM by then:

comparing a given hash generated in response to occurrence of a given detected system hang event with multiple different hashes stored in a fault table in the NVM, the fault table comprising multiple different hashes corresponding to respective different corrective actions to be taken to address respective causes of different system hang faults, determining a corrective action that corresponds to one of the fault table hashes that matches the given hash of the detected system hang fault, and applying the determined corrective action.

28. A method, comprising:

executing a given host operating system (OS) and a system basic input/output system (SBIOS) on an in-band host processing device of an information handling system; and using an out-of-band processing device of the information handling system that is separate from the in-band host processing device to:

monitor for indication of a system hang event occurring on the in-band host processing device during in-band execution of the given host OS, detect an indication of a system hang event occurring on the in-band host processing device during in-band execution of the given host OS, and respond to the detected indication of the system hang event by communicating with the in-band host processing device to cause the SBIOS to generate fault information from system context information of the given host in-band processing device at the time of the system hang event and to save the generated fault information to non-volatile memory (NVM);

responding to the indication of a system hang event occurring during in-band execution of the given host OS by providing a designated system management interrupt (SMI) from the out-of-band processing device to the in-band host processing device while the in-band host processing device is in a system hang state; and responding to receipt of the designated SMI at the in-band host processing device by entering system management mode (SMM) on the in-band host processing device and generating the fault information from system context information and saving the generated fault information to the NVM during SMM;

using the SBIOS executing on the in-band host processing device to respond to receipt of the designated SMI by retrieving the system context information from system management random access memory (SMRAM), generating fault information from the system context information that includes a hash that comprises information associated with a source of a system hang fault corresponding to the system hang event, and saving the generated hash with the fault information to the NVM; and using the SBIOS executing on the in-band host processing device to respond to a reboot of the information handling system after the saving of the generated hash with the fault information to the NVM by then:

comparing a given hash generated in response to occurrence of a given detected system hang event with multiple different hashes stored in a fault table in the NVM, the fault table comprising multiple different hashes corresponding to respective different corrective actions to be taken to address respective causes of different system hang faults, and determining information regarding a cause of the fault, and then communicating the determined information regarding the cause of the fault to a system user.

29. An information handling system, comprising:
an in-band host processing device configured to execute a given host operating system (OS) and to execute a system basic input/output system (SBIOS);
an out-of-band processing device separate from the in-band host processing device, the out-of-band processing device being coupled in data communication with the in-band host processing device;
non-volatile memory (NVM) coupled in data communication with the in-band host processing device and the out-of-band processing device;
where the out-of-band processing device is coupled to detect and respond to an indication of a system hang event occurring on the in-band host processing device during in-band execution of the given host OS by causing the SBIOS to generate fault information from system context information of the host in-band processing device at the time of the system hang event and to save the generated fault information to the NVM; and
where the information handling system further comprises a system motherboard, each of the in-band processing device, out-of-band processing device, and NVM being integrated on the system motherboard; and where the out-of-band processing device is an embedded controller that implements power management settings for the information handling system.

30. An information handling system, comprising:
an in-band host processing device configured to execute a given host operating system (OS) and to execute a system basic input/output system (SBIOS);
an out-of-band processing device separate from the in-band host processing device, the out-of-band processing device being coupled in data communication with the in-band host processing device; and
non-volatile memory (NVM) coupled in data communication with the in-band host processing device and the out-of-band processing device;
where the out-of-band processing device is coupled to detect and respond to an indication of a system hang event occurring on the in-band host processing device during in-band execution of the given host OS by causing the SBIOS to generate fault information from system context information of the host in-band processing device at the time of the system hang event and to save the generated fault information to the NVM;
where the out-of-band processing device is programmed to respond to the indication of a system hang event occurring during in-band execution of the given host OS by providing a designated system management interrupt (SMI) to the in-band host processing device while the in-band host processing device is in a system hang state; and where the SBIOS executing on the in-band host processing device is programmed to respond to receipt of the designated SMI by entering system management mode (SMM) and generating the fault information from system context information and saving the generated fault information to the NVM during SMM;
where the SBIOS executing on the in-band host processing device is programmed to respond to receipt of the designated SMI by retrieving the system context information from system management random access memory (SMRAM); generating fault information from the system context information that includes a hash that comprises information associated with a source of a system hang fault corresponding to the system hang event, and saving the generated hash with the fault information to the NVM; and
where the information handling system further comprises a fault table stored in the NVM, the fault table comprising multiple different hashes corresponding to respective different corrective actions to be taken to address respective causes of different system hang faults; and where the SBIOS executing on the in-band host processing device is programmed to respond to a reboot of the information handling system after the saving of the generated hash with the fault information to the NVM by then comparing a given hash generated in response to occurrence of a given detected system hang event with the multiple different hashes stored in the fault table to determine and apply a corrective action that corresponds to one of the fault table hashes that matches the given hash of the detected system hang event.

* * * * *